United States Patent
Maruta et al.

(10) Patent No.: US 6,460,923 B1
(45) Date of Patent: Oct. 8, 2002

(54) SUPPORT MECHANISM OF VEHICLE SEAT

(75) Inventors: Tsutomu Maruta, Shimoyama-mura (JP); Daisuke Ono, Aichi-ken (JP)

(73) Assignee: Arako Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/637,012

(22) Filed: Aug. 14, 2000

(51) Int. Cl.[7] ................................................ A47C 4/00
(52) U.S. Cl. ........................................................ 297/53
(58) Field of Search ...................... 297/378.12, 378.13, 297/451.2, 451.3, 31, 46, 47, 48, 49, 50, 51, 53

(56) References Cited

U.S. PATENT DOCUMENTS

| | | | | |
|---|---|---|---|---|
| 2,244,399 A | * | 6/1941 | Kovats | 297/47 |
| 2,799,321 A | * | 7/1957 | Liljengren et al. | 297/51 |
| 4,869,541 A | * | 9/1989 | Wainwright | 297/378.13 |
| 5,383,699 A | * | 1/1995 | Woriekonski et al. | 297/378.12 |
| 6,135,555 A | * | 10/2000 | Liu et al. | 297/378.12 |

FOREIGN PATENT DOCUMENTS

| | | |
|---|---|---|
| DE | 9112213 | 2/1992 |
| FR | 629371 | 11/1927 |
| WO | WO 96/17743 | 6/1996 |

* cited by examiner

*Primary Examiner*—Michael Safavi

(57) ABSTRACT

A support mechanism for support of a seat cushion of a passenger seat at one side thereof on a vehicle compartment floor, which includes a side leg pivotally mounted to a support frame of the seat cushion at one side thereof to be retained in an upright position and housed in a space under the bottom of the seat cushion, a turnover spring engaged at one end thereof with the support frame of the seat cushion and at the other end thereof with the side leg for biasing the side leg toward its folding direction or set-up direction when it is turned over during pivotal movement of the side leg, a lock device for restricting pivotal movement of the side leg placed in its upright position and for retaining the side leg in its upright position; and a release lever associated with the locking device for releasing a locked condition of the side leg.

3 Claims, 6 Drawing Sheets

SUPPORT MECHANISM OF VEHICLE SEAT

BACKGROUND OF THE INVENTION

1. Field of the Invention

The present invention relates to a support mechanism for support of one of a plurality of passenger seats arranged in parallel in a vehicle compartment.

2. Description of the Prior Art

As in the support mechanism, the support leg retained in its set-up condition under the load of the turnover spring, the support leg tends to be folded if applied with an excessive load against the turnover spring or applied with a heavy load from a seat belt anchor. For this reason, a relatively strong spring is used as the turnover spring. In use of such a turnover spring, a large effort is required to set up or fold the support leg.

As in the support mechanism, the support leg retained in its set-up condition under the load of the turnover spring, the support let tends to be folded if applied with an excessive load against the turnover spring or applied with a heavy load from a seat belt anchor. For this reason, a relatively strong spring is used as the turnover spring. In use of such a turnover spring, a large effort is required to set up or fold the support leg.

SUMMARY OF THE INVENTION

It is, therefore, a primary object of the present invention to provide a support mechanism capable of firmly retaining a support leg in an upright position without using a strong turnover spring and of smoothly setting up or folding the support leg without any large effort in operation.

According to the present invention, the object is accomplished by providing a support mechanism for support of a seat cushion of a passenger seat at one side thereof on a vehicle compartment floor, which comprises a side leg pivotally mounted to a support frame of the seat cushion at one side thereof to be retained in an upright position and housed in a space under the bottom of the seat cushion; a turnover spring engaged at one end thereof with the support frame of the seat cushion and at the other end thereof with the side leg for biasing the side leg toward its folding direction or set-up direction when it is turned over during pivotal movement of the side leg; lock means for restricting pivotal movement of the side leg placed in its upright position and for retaining the side leg in its upright position; and release means for releasing a locked condition of the side leg.

In a practical embodiment of the present invention, it is preferable that the lock means comprises a lock bracket pivotally mounted to the support frame of the seat cushion to support the side leg secured thereto, the lock bracket having an outer periphery formed with an engagement recess; and a lock pin mounted on the support frame of the seat cushion to be brought into engagement with the engagement recess of the lock bracket when the side leg is retained in its upright position and to be disengaged from the engagement recess of the lock bracket when the side leg is pivotally moved upward; wherein the turnover spring is engaged at one end thereof with the lock pin and at the other end thereof with the lock bracket for biasing the lock pin toward the outer periphery of the lock bracket and for maintaining the lock pin in engagement with the engagement recess of the lock bracket; and wherein the release means comprises a release lever pivotally mounted to the support frame of the seat cushion coaxially with the lock bracket, the release lever having an outer periphery formed with a cam surface maintained in resilient engagement with the lock pin under the load of the turnover spring to disengage the lock pin from the engagement recess of the lock bracket when it is moved upward.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
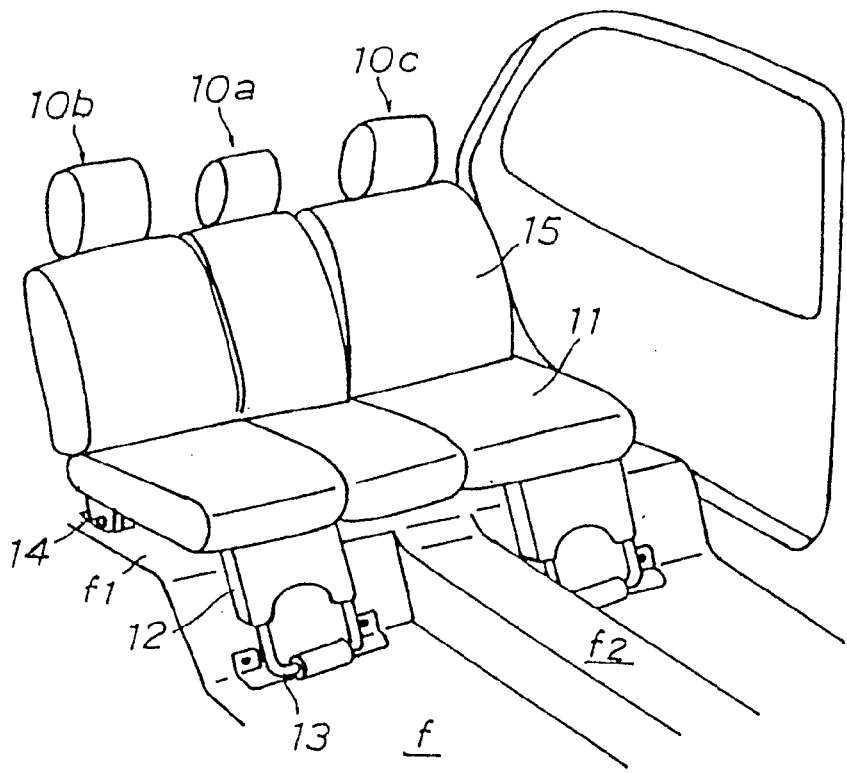
FIG. 1 is a perspective view of a rear passenger seat composed of three seats arranged in parallel in a vehicle compartment, wherein a center seat of the rear seat is equipped with a support mechanism in accordance with the present invention.
Figure 2:
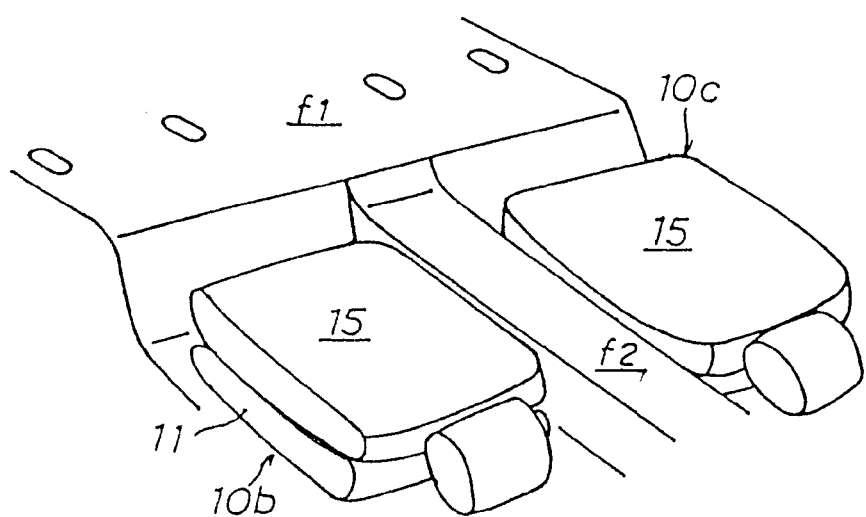
FIG. 2 illustrates a folded condition of both side seats of the rear passenger seat.

Illustrated in FIG. 1 of the drawings is a rear passenger seat in the form of three seats arranged in parallel in a vehicle compartment. The rear passenger seat is composed of a center seat 10a and a pair of side seats 10b, 10c which can be folded down and housed in a recessed portion f of the compartment floor as shown in FIG. 2. Each seat cushion 11 of the side seats 10b, 10c has a leg support 12 assembled at its front-end bottom and pivoted to upper ends of a U-shaped support leg 13 pivotally mounted on the recessed portion f of the compartment floor to be folded in a fore-and-aft direction. The seat cushion 11 is locked in place by means of a lock mechanism 14 on a deck portion f1 of the compartment floor. When the lock mechanism 14 is released, the seat cushion 11 can be moved forward with a back rest 15 folded thereon and housed in the recessed portion f of the compartment floor so that a rear surface of the back rest 15 is placed at the same level as the deck portion f1 of compartment floor as shown in FIG. 2. The center seat 10a is detachably jointed at one side thereof to the seat cushion 11 of side seat 10c by means of a joint mechanism (not shown) and supported by a support mechanism 20 on the deck portion f1 of compartment floor at a position opposed to a tunnel portion f2 of the compartment floor. When it is desired to house the side seat 10c in a folded condition in the recessed portion f of the compartment floor, the center seat 10a can be separated from the side seat 10c.

Figure 3:
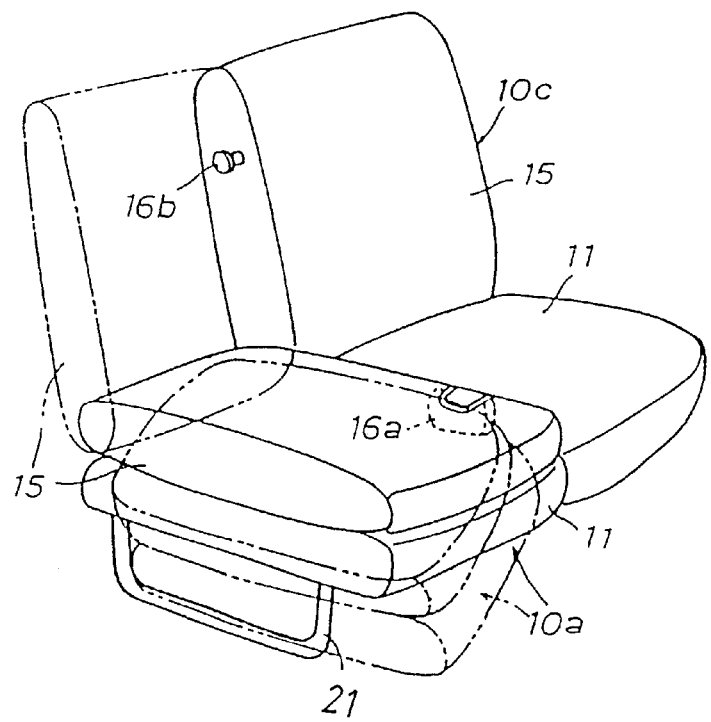
FIG. 3 illustrates the center seat jointed at one side thereof to one of the side seats.
Figure 4:
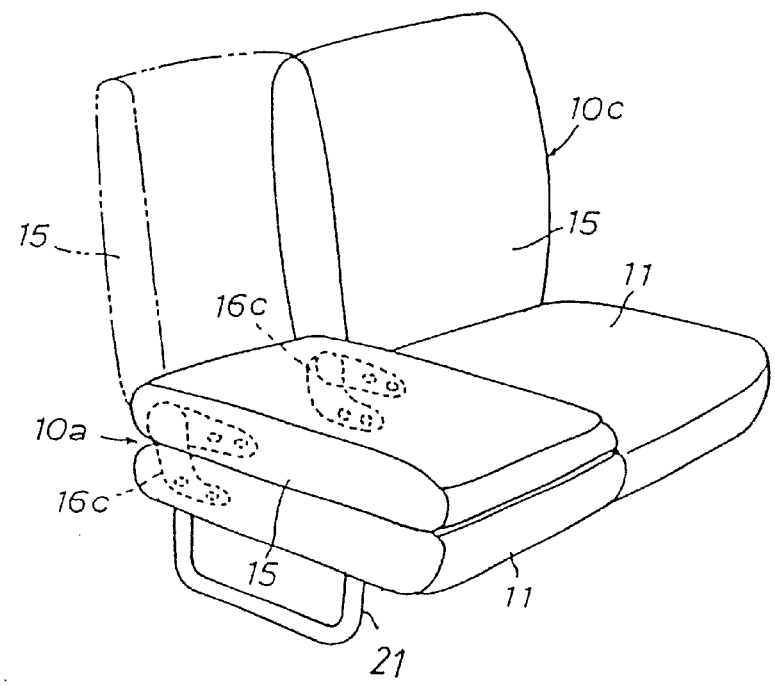
FIG. 4 illustrates another center seat jointed at one side thereof to one of the side seats.

Illustrated in FIGS. 3 and 4 are two embodiments of the center seat 10a. The center seat 10a shown in FIG. 3 is composed of seat cushion 11 detachably jointed at one side thereof to the seat cushion 11c of side seat 10c by means of a joint mechanism (not shown) and a back rest 15 detachably jointed at one side thereof to the back rest 15 of side seat 10c by means of a back lock 16a engageable with a back striker 16b fixed to the back rest 15 of side 10c. The center seat 10a shown in FIG. 4 is composed of a seat cushion 11 placed in contact with the seat cushion 11 of side seat 10c and a back rest 15 pivotally connected to the seat cushion 11 by means of a pair of reclining mechanisms 16c. As shown in FIGS. 3 and 4, the center seats 10a each are supported by a side leg 21 of the support mechanism 20 on the deck portion f1 of the compartment floor and can be removed from the side seat 10c as shown by two-dots and dash lines in FIG. 3.

Figure 5:
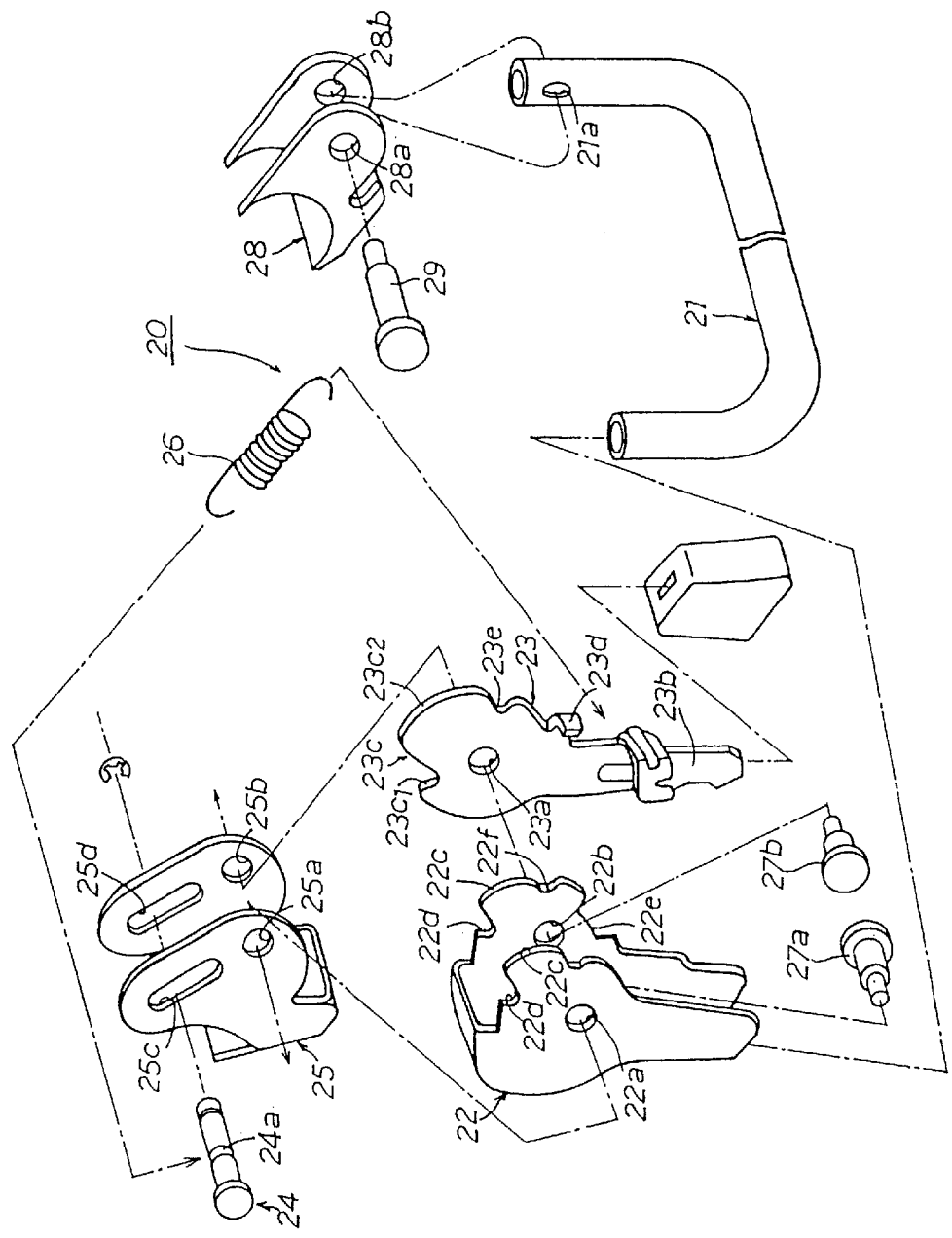
FIG. 5 illustrates disassembled component parts of the support mechanism shown in FIG. 1.

As shown in FIG. 5, the support mechanism 20 includes the side leg 21, a lock bracket 22, a release lever 23, a lock pin 24, a base bracket 25 and a turnover spring 26. The lock bracket 22, lock pin 24, base bracket 25 and turnover spring 26 are adapted to provide a locking device for the support mechanism 20, and the lock bracket 22 and base bracket 25 are associated with joint pins 27a, 27b for mounting the side leg 21 to a support frame 11a of the seat cushion 11c at its front side. The release lever 23 is assembled with the lock bracket 22 to release the locking device. A mounting bracket 28 and a connecting pin 29 are adapted for mounting the side leg 21 to the support frame 11a of seat cushion 11c at its rear side.

Figure 6:
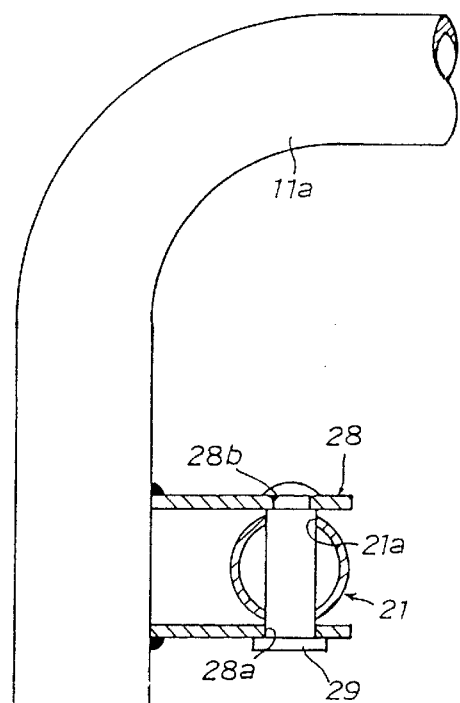
FIG. 6 is a cross-sectional view of a rear portion of a side support leg in the support mechanism.
Figure 7:
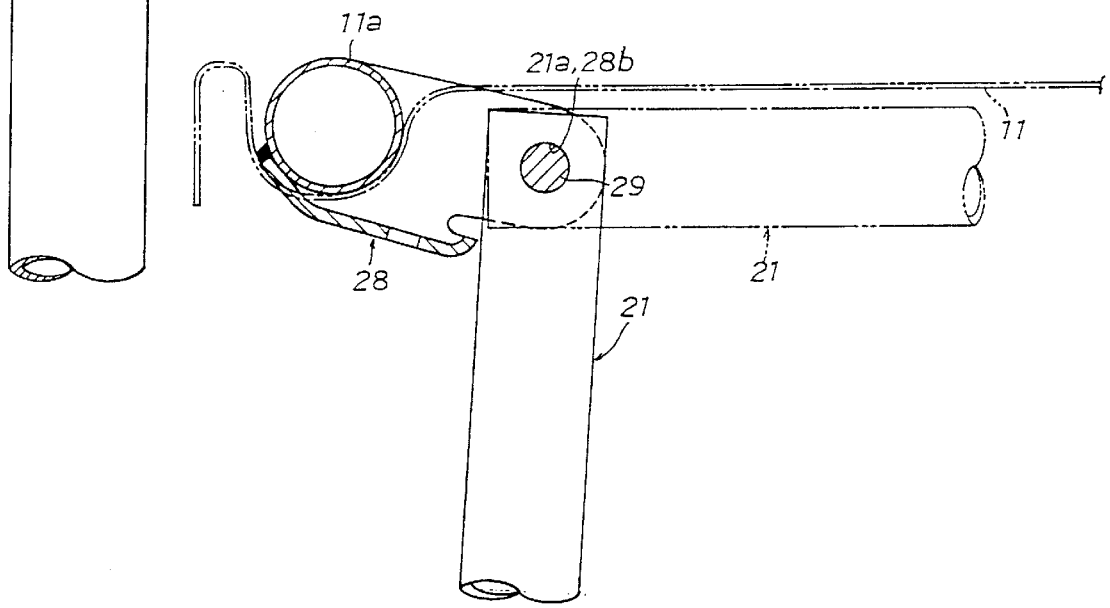
FIG. 7 is a vertical sectional view of the mounted portion of the side support leg shown in FIG. 6.

As shown in FIGS. 6 and 7, the side leg 21 is mounted at its rear side to the support frame 11a of seat cushion 11 by means of the mounting bracket 28 and connecting pin 29. In this mounting construction, the mounting bracket 28 is welded to the support frame 11a of seat cushion 11, and the connecting pin 29 is mounted across through holes 28a, 28b of mounting bracket 28 and through holes 21a of side leg 21 and anchored to the mounting bracket 28 to support the side leg 21 for pivotal movement in a vertical plane.

Figure 8:
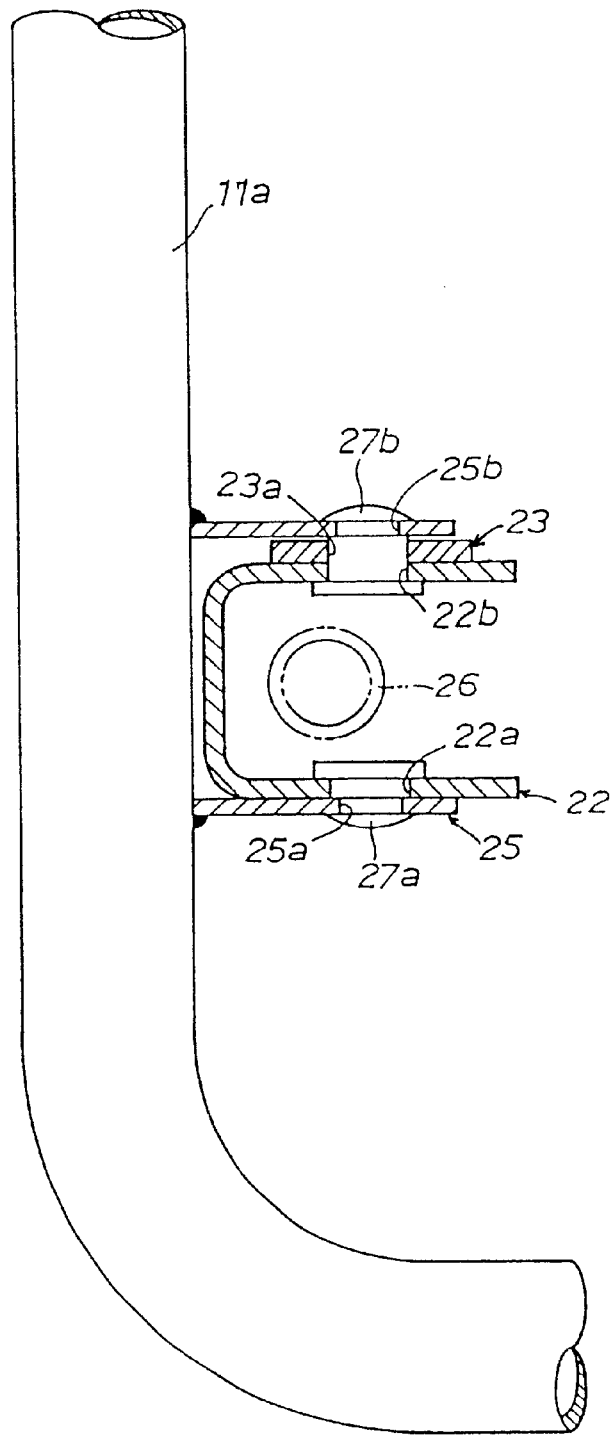
FIG. 8 is a cross-sectional view of a front portion of the side support leg in the support mechanism.
Figure 9:
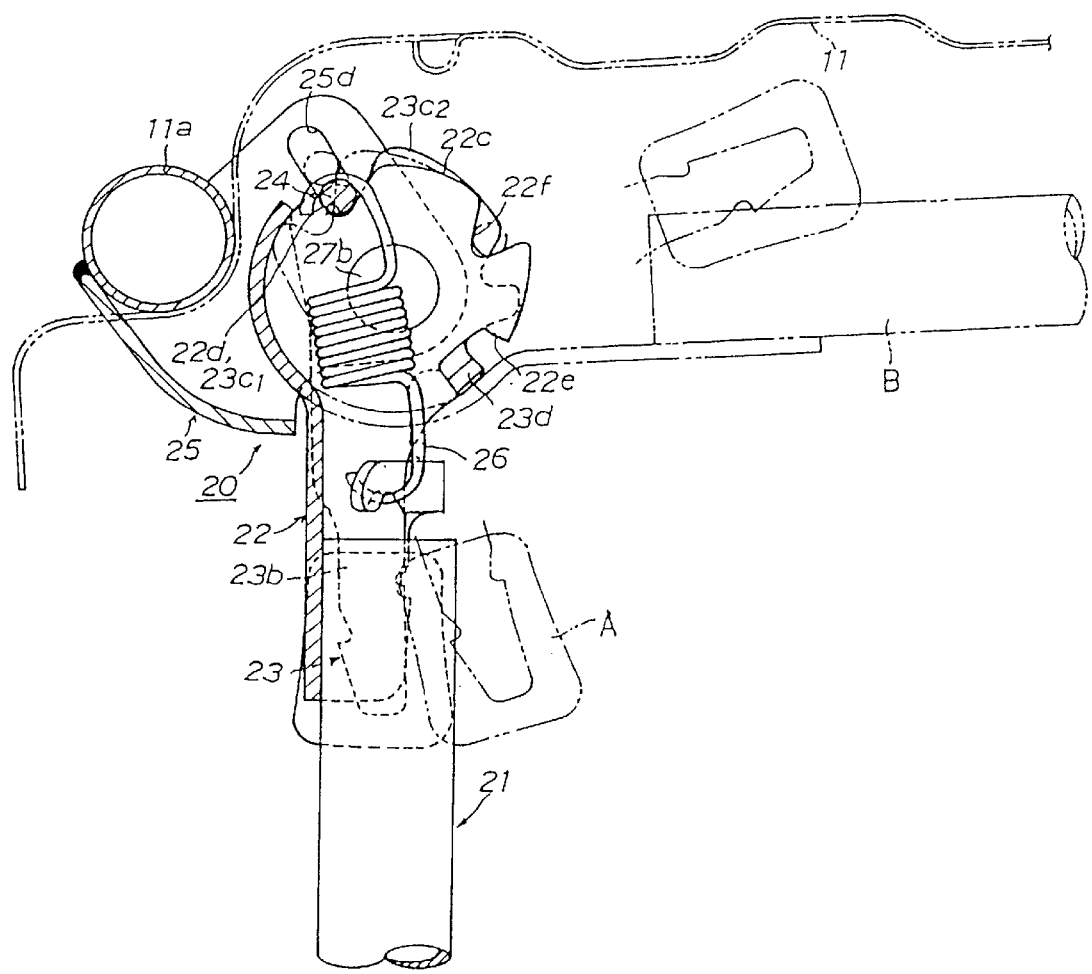
FIG. 9 is a vertical sectional view of the mounted portion of the side support leg shown in FIG. 8.

As shown in FIGS. 8 and 9, the side leg 21 is pivotally mounted at its front side to the pipe frame 11a of seat cushion 11 by means of the lock bracket 22, base bracket 25 and connecting pins 27a, 27b. In this mounting construction, the base bracket 25 is welded to the pipe frame 11a of seat cushion 11, and the side leg 21 is secured to the lock bracket 22 at its front side. The connecting pin 27a is mounted across a through hole 22a formed in one of arms of lock bracket 22 and a through hole 25a formed in one of arms of base bracket 25, while the connecting pin 27b is mounted across a through hole 22b formed in the other arm of lock bracket 22, a through hole 23a formed in a release lever 23 and a through hole 25b formed in the other arm of base bracket 25b. Thus, the side leg 21 is pivotally mounted to the support frame 11a of seat cushion 11 for pivotal movement in a vertical plane.

In the mounting construction, the release lever 23 is placed between the right-hand arm of lock bracket 22 and the right-hand arm of base bracket 25 and is pivotally supported by the connecting pin 27b. As clearly shown in FIG. 5, the lock pin 24 is mounted across elongated through holes 25c, 25d formed in the arms of base bracket 25 and supported by engagement with upper outer peripheries of lock bracket 22 and release lever 23. The turnover spring 26 is placed between both the arms of lock bracket 22 and engaged at its one end with an annular groove 24a formed on a central portion of lock pin 24 and at its other end with projection 23d of release lever 23. Under the load of turnover spring 26, the lock pin 24 is maintained in resilient engagement with the upper outer peripheries of lock bracket 22 and release lever 23. When the side leg 21 is pivotally moved in a vertical plane, the load of turnover spring 26 is turned over at a rotary fulcrum of lock bracket 22 and release lever 23.

As shown in FIGS. 5 and 9, both the arms of lock bracket 22 are formed at their upper outer peripheries with cam surfaces 22c and circumferentially spaced engagement recesses 22d, 22f. The right-hand arm of lock bracket 22 is further formed with a recess 22e. The release lever 23 is formed at its upper outer periphery with a cam surface 23c in the form of a recessed cam surface 23c1 and a protruded can surface 23c2, an engagement recess 23e and the projection 23d. In a condition where the release lever 23 has been pivotally supported by the connecting pin 27b as shown in FIGS. 8 and 9, the projection 23d of release lever 23 is placed in the semi-circular recess 22e of lock bracket 22, and the recessed cam surface 23c1 of release lever 23 is aligned with the engagement recesses 22d of lock bracket 22 for engagement with the lock pin 24.

The semi-circular recess 22e of lock bracket 22 is formed larger in width than the projection 23d of release lever 23 to permit rotary movement of the release lever 23 at a predetermined angle. The cam surface 23c of release lever 23 is formed larger in width than the cam surface 22c of lock bracket 22 and acts to push up the lock pin 24 retained in resilient engagement with the recesses 22d of lock bracket 22 when the release lever 23 is rotated in a counterclockwise direction. In a condition where the side leg 21 is retained in an upright position as shown in FIG. 9, the side leg 21 is loaded by the turnover spring 26 toward its upright position, and the lock pin 24 is maintained in engagement with the engagement recesses 22d of lock bracket 22 and the recessed cam surface 23c1 of release lever 23 under the load of turnover spring 26. Thus, pivotal movement of the side leg 21 in the vertical plane is restricted by engagement of lock pin 24 with the lock bracket 22 to firmly support the center seat 10a in place on the deck portion f1 of the vehicle compartment floor f.

When it is desired to fold the side leg 21 for removal of the center seat 10a from the side seat 10c, the release lever 23 is rotated in a counterclockwise director in FIG. 9. In this instance, the release lever 23 can be rotated in an extent permitted by the semi-circular recess 22e of lock bracket 22 to raise the lock pin 24 on its protruded cam surface 23c2 from its recessed cam surface 23c1 and to raise the lock pin 24 on the cam surfaces 22c of lock bracket 22 from the recesses 22d. As a result, the side leg 21 can be pivotally moved upward with the lock bracket 22 release lever 23. When the side leg 21 is moved upward against the load of turnover spring 26, the lock pin 24 slides on the cam surfaces 22c of lock bracket 22 and the cam surface 23c2 of release lever 23 during which the load of turnover spring 26 is turned over to bias the side leg 21 in its folding direction. Finally, the lock pin 24 is brought into engagement with engagement recesses 22f of lock bracket 22 and the engagement recess 23e of release lever 23 under the load of turnover spring 26 to restrict upward rotation of the side leg 21. Thus as shown by imaginary lines B in FIG. 9, the side leg 21 is housed in a space under the bottom of seat cushion 11.

In a condition where the side leg 21 has been housed in the space under the bottom of seat cushion 11, the side leg 21 is retained in its folded position under the load of turnover spring 26. When the side leg 21 is moved by an operation effort against the load of turnover spring 26 in a clockwise direction in FIG. 9, the side leg 21 can be returned to the upright position as shown by solid lines in the figure.

As is understood from the above description, the locking device composed of the lock bracket 22, lock pin 24 and turnover spring 26 acts to restrict pivotal movement of the side leg 21 retained in its upright position under the load of turnover spring 26. With the locking device, the side leg 21 is firmly retained in its upright position even if applied with an excessive load more than the load of turnover spring 26 or a heavy load from a belt anchor of the center seat.

With the support mechanism 20 described above, the side leg 21 can be firmly retained in its upright position without using a strong turnover spring as in conventional support mechanisms, and the side leg 21 can be raised and folded by a relatively small operation effort. As in the support mechanism 20, the release lever 23 is assembled with the lock bracket 22 of the locking device, a release mechanism can be associated with the locking device in a simple construction, and the side leg 21 can be locked in its upright position and released from its locked condition in a simple manner.

What is claimed is:

1. A support mechanism for support of a seat cushion of a passenger seat at one side thereof on a vehicle compartment floor, comprising:

a side leg pivotally mounted to a side portion of a support frame of said seat cushion to be either retained in an upright position for support of the seat cushion or upwardly folded and housed under the bottom of said seat cushion;

a turnover spring engaged at one end thereof with the support frame of said seat cushion and at the other end thereof with said side leg for biasing said side leg toward either an upwardly folded position or an upright position when being turned over during pivotal movement of said side leg;

locking means for retaining said side leg in either the upright position or the upwardly folded position; and release means working in conjunction with said locking means for releasing said side leg from the upright position or the upwardly folded position thereby moving pivotally.

2. A support mechanism for support of a seat cushion of a passenger seat as claimed in claim 1, wherein said locking means comprises a lock bracket pivotally mounted to the side portion of the support frame of said seat cushion to support said side leg secured thereto; said lock bracket having an upper outer periphery formed with an engagement recess; and a lock pin mounted on the support frame of said seat cushion to be either brought into engagement with the engagement recess of said lock bracket when said side leg is retained in the upright position or disengaged from the engagement recess of said lock bracket when said side leg is folded upwardly, wherein said release means comprises a release lever pivotally mounted to support frame of said seat cushion coaxially with said lock bracket, said release lever having an upper outer periphery formed with a cam surface maintained in resilient engagement with said lock pin under the load of said turnover spring to disengage the engagement recess of said look bracket from said lock pin when it is moved upward, and wherein said turnover spring is engaged at one end thereof with said lock pin and at the other end thereof with said release lever for biasing said lock pin toward the upper outer periphery of said lock bracket and for maintaining said lock pin in engagement with the engagement recess of said lock bracket.

3. A support mechanism for support of a seat cushion of a passenger seat as claimed in claim 2, wherein said lock pin is slidably carried by engagement with an elongated hole formed in a base bracket secured to the support frame of said seat cushion and engaged with one end of said turnover spring.

* * * * *